Patented Jan. 12, 1943

2,307,875

UNITED STATES PATENT OFFICE 2,307,875

MANUFACTURE OF CHLOROHYDRINS

Hyym E. Buc and Clifford W. Muessig, Roselle, N. J., assignors to Standard Oil Development Company, a corporation of Delaware No Drawing. Application May 22, 1940, Serial No. 336,586

12 Claims. (Cl. 260—634)

This invention relates to the preparation of chlorine-containing organic hydroxy compounds and particularly to a method of converting olefins into chlorohydrins.

It is known that primary and secondary olefins, having the structure —CH=CH—, may be reacted in the presence of water with alkyl hypochlorites, particularly the tertiary alkyl hypochlorites, to form chlorohydrins corresponding to the olefins reacted. The reaction is facilitated by the presence of small amounts of an acid catalyst. When it is attempted to perform a similar reaction with a tertiary olefin, i. e., an olefin having the structure

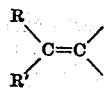

where R and R' are alkyl radicals, there is formed a considerable quantity of chlorine-substituted olefins but substantially no yield of chlorohydrins.

It is an object of the present invention to provide a means by which the reaction of alkyl hypochlorites with tertiary olefins may be considerably facilitated and the yield of chlorohydrins substantially increased. Tertiary olefins are readily available as raw materials in certain fractions of cracked petroleum oils, from which they are readily separated as a preliminary step in the manufacture of secondary aliphatic alcohols from such oils. The chlorohydrins resulting from the reaction of alkyl hypochlorites with tertiary olefins are useful as intermediates in the manufacture of glycols and other products.

According to the present invention, a tertiary olefin is treated with an alkyl hypochlorite, in the liquid phase, in the presence of water and small quantities of an acid and an organic peroxide. It is preferable to react equal molecular quantities of olefin, hypochlorite and water. In general, any alkyl hypochlorite may be employed, but the tertiary esters are preferred, since they are the most stable, and tertiary butyl hypochlorite has been found to be especially suitable. The most satisfactory and available acid for use in the process is sulfuric acid, although other highly ionized acids, particularly those having ionization constants at least of the order of $10^{-2}$ at ordinary temperatures, may be employed. As catalysts may be employed any organic peroxide, of which acetone peroxide, benzoyl peroxide, peroxides of ethers, phthalic acid peroxide and terpene peroxides may be mentioned as suitable examples. The acid and peroxide are preferably present in the reaction mixture in quantities ranging from 0.2% to 2% by weight of each of the ingredients, based upon the amount of olefin present. It is preferred to add the hypochlorite very slowly to the olefin-catalyst mixture to insure a smooth reaction and to avoid any danger of explosion.

As pointed out above, the invention has particular value, since tertiary olefins do not ordinarily react with alkyl hypochlorites to give chlorohydrins. When such reactions are carried out in the presence of an organic peroxide, substantial yields of chlorohydrins are obtained. The method is particularly effective in the case of reactions of alkyl hypochlorites with tertiary olefins having not more than five carbon atoms per molecule.

Trimethylethylene is an example of a tertiary olefin which is present in petroleum fractions. It is present, in quantities ranging from 10% to 15%, in the $C_5$ fraction obtained by distillation of cracked oils. It may be readily separated from the $C_5$ fraction by extracting the latter with 70% sulfuric acid at about 0° C., diluting the extract with water to obtain a mixture of about 40% acid concentration, and heating the diluted extract under fractionation conditions while taking off the trimethylethylene as overhead product.

The process of the invention may be carried out, if desired, by reacting the alkyl hypochlorite directly with a petroleum fraction containing tertiary olefins, such as, for example, a $C_5$ fraction obtained by the distillation of cracked oils, which contains a mixture of olefins; and the product obtained will be a mixture of the corresponding chlorohydrins.

The method of the present invention may be illustrated by the following examples:

Example 1

To one molecular proportion of trimethylethylene, mixed with 0.5% of benzoyl peroxide and 0.5% of concentrated sulfuric acid, was added one molecular proportion of water, and to this mixture was added one molecular proportion of tertiary butyl hypochlorite. The addition of the tertiary butyl hypochlorite was carried out very carefully to avoid an explosion. This was accomplished by adding the reactant slowly, while the mixture was being well agitated, at such a rate that the temperature did not vary more than 2 or 3 degrees above or below 32° C. The reaction was completed when a small sample of the reaction mixture gave a positive test for free chlorine, indicating the presence of an excess of tertiary butyl hypochlorite. After the reaction was completed, the mixture was fractionated, and a yield of approximately 40% of the chlorohydrin of trimethylethylene, boiling at 130–138° C., was obtained. The purity of this product was found to be about 90%.

Example 2

An attempt was made to react tertiary butyl hypochlorite with trimethylethylene under conditions which were identical with those of the preceding example, except that no organic peroxide was present. The yield of chlorohydrin was found to be practically negligible, although a yield of approximately 30% of chloro-olefins was obtained.

The invention is not to be considered as being limited by any of the examples of the process herein discussed which are given by way of illustration only.

We claim:

1. The method of preparing a chlorohydrin which comprises treating a tertiary olefin with an alkyl hypochlorite in the liquid phase in the presence of water, a small quantity of an organic peroxide and a small quantity of a highly ionized acid.

2. The method of preparing a chlorohydrin which comprises treating a tertiary olefin with a tertiary alkyl hypochlorite in the liquid phase in the presence of water, a small quantity of an organic peroxide and a small quantity of a highly ionized acid.

3. The method of preparing a chlorohydrin which comprises treating a tertiary olefin having not more than five carbon atoms per molecule with a tertiary alkyl hypochlorite in the liquid phase in the presence of water, a small quantity of an organic peroxide and a small quantity of a highly ionized acid.

4. The method of preparing tertiary chlorohydrins which comprises treating a petroleum fraction containing olefins, including tertiary olefins with a tertiary alkyl hypochlorite in the liquid phase in the presence of water, a small quantity of an organic peroxide and a small quantity of a highly ionized acid.

5. The method of preparing tertiary chlorohydrins which comprises treating a $C_5$ petroleum fraction containing olefins, including tertiary olefins with a tertiary alkyl hypochlorite in the liquid phase in the presence of water, a small quantity of an organic peroxide and a small quantity of a highly ionized acid.

6. The method of preparing a chlorohydrin which comprises treating about one molecular proportion of a tertiary olefin with about one molecular proportion of a tertiary alkyl hypochlorite in the liquid phase in the presence of about one molecular proportion of water, about 0.2% to about 2% of an organic peroxide and about 0.2% to about 2% of a highly ionized acid, the percentages of organic peroxide and acid being based upon the weight of the tertiary olefin present.

7. A method of preparing a chlorohydrin which comprises treating about one molecular proportion of a tertiary olefin with about one molecular proportion of tertiary butyl hypochlorite in the liquid phase in the presence of about one molecular proportion of water, about 0.2% to about 2% of an organic peroxide and about 0.2% to about 2% of a highly ionized acid, the quantities of organic peroxide and acid being based upon the weight of tertiary olefin which is present.

8. A method of preparing the chlorohydrin of trimethylethylene which comprises treating about one molecular proportion of trimethylethylene with about one molecular proportion of tertiary butyl hypochlorite in the liquid phase in the presence of about one molecular proportion of water, about 0.2% to about 2% of an organic peroxide and about 0.2% to about 2% of sulfuric acid, the quantities of organic peroxide and sulfuric acid being based upon the weight of the trimethylethylene which is present.

9. The method of preparing the chlorohydrin of trimethylethylene which comprises treating about one molecular proportion of trimethylethylene with about one molecular proportion of tertiary butyl hypochlorite in the liquid phase in the presence of about one molecular proportion of water, 0.2% to about 2% of benzoyl peroxide and about 0.2% to about 2% of sulfuric acid, the quantities of benzoyl peroxide and sulfuric acid being based upon the weight of the trimethylethylene which is present.

10. The method of preparing the chlorohydrin of trimethylethylene which comprises treating about one molecular proportion of trimethylethylene with about one molecular proportion of tertiary butyl hypochlorite in the liquid phase in the presence of about one molecular proportion of water, about 0.5% of benzoyl peroxide and about 0.5% of concentrated sulfuric acid, the quantities of benzoyl peroxide and sulfuric acid being based upon the weight of the trimethylethylene which is present.

11. The method of preparing the chlorohydrin of trimethylethylene which comprises treating about one molecular proportion of trimethylethylene with about one molecular proportion of tertiary butyl hypochlorite in the presence of about one molecular proportion of water, about 0.5% of benzoyl peroxide and about 0.5% of concentrated sulfuric acid at a temperature not higher than about 32° C., and separating the chlorohydrin formed from the reaction product, the quantities of benzoyl peroxide and sulfuric acid being based upon the weight of the trimethylethylene which is present.

12. The method of preparing tertiary chlorohydrins which comprises treating a petroleum fraction containing olefins, including tertiary olefins, with an alkyl hypochlorite in the liquid phase in the presence of water, a small quantity of an organic peroxide and a small quantity of a highly ionized acid.

HYYM E. BUC.
CLIFFORD W. MUESSIG.